(12) United States Patent
Zhan et al.

(10) Patent No.: US 10,413,120 B2
(45) Date of Patent: Sep. 17, 2019

(54) GRILL DEVICE

(71) Applicant: Tsann Kuen (Zhangzhou) Enterprise Co., Ltd., Zhangzhou (CN)

(72) Inventors: Yixin Zhan, Zhangzhou (CN); Dongmei Chen, Zhangzhou (CN); Wenyu Chang, Zhangzhou (CN); Xiaoyue Zhu, Zhangzhou (CN)

(73) Assignee: Tsann Kuen (Zhangzhou) Enterprise Co., Ltd., Zhangzhou (CN)

( * ) Notice: Subject to any disclaimer, the term of this patent is extended or adjusted under 35 U.S.C. 154(b) by 343 days.

(21) Appl. No.: 15/239,946

(22) Filed: Aug. 18, 2016

(65) Prior Publication Data

US 2017/0049268 A1 Feb. 23, 2017

(30) Foreign Application Priority Data

Aug. 21, 2015 (CN) .......................... 2015 1 0516436

(51) Int. Cl.
*A47J 37/06* (2006.01)
(52) U.S. Cl.
CPC ................................. *A47J 37/0611* (2013.01)
(58) Field of Classification Search
CPC ........ A47J 37/00; A47J 37/06; A47J 37/0611; A47J 2037/0617; A47J 37/067; A47J 37/0676
USPC ......... 99/326–334, 339, 372, 374, 376, 377, 99/378
See application file for complete search history.

(56) References Cited

U.S. PATENT DOCUMENTS 5,299,492 A * 4/1994 Carbon .................. A21B 5/023
219/524
2007/0283821 A1* 12/2007 May ..................... A47J 37/0611
99/372

FOREIGN PATENT DOCUMENTS

CN 102085074 A 6/2011

OTHER PUBLICATIONS

Search Report appended to an Office Action, which was issued to Chinese counterpart application No. 201510516436.0 by the SIPO dated Jul. 5, 2018, with an English translation thereof.

* cited by examiner

*Primary Examiner* — Brian W Jennison
(74) *Attorney, Agent, or Firm* — Burris Law, PLLC

(57) ABSTRACT

A grill device is for cooking a fluidic food material, and includes an upper grill unit and a lower grill unit. The lower grill unit includes a lower grill plate. The upper grill unit removably covers and is operable to uncover the lower grill unit, and includes an upper grill plate that cooperates with the lower grill plate to define a cooking space therebetween, which is adapted to accommodate the fluidic food material when cooking, and that defines an opening, which is in spatial communication with the cooking space and which is adapted to permit the fluidic food material to flow into the cooking space therethrough.

14 Claims, 8 Drawing Sheets

GRILL DEVICE

CROSS-REFERENCE TO RELATED APPLICATION

This application claims priority of Chinese Patent Application No. 201510516436.0, filed on Aug. 21, 2015.

FIELD

The disclosure relates to a grill device, more particularly to a waffle iron that has an opening which guides flow of a fluidic food material, and that is provided with a cutting unit for cutting away excess portions of waffles so as to form waffles that are consistent in shape.

BACKGROUND

Referring to FIG. 1, a conventional grill device, e.g., a waffle iron, includes a lower grill unit 11, and an upper grill unit 12 pivotally connected to the lower grill unit 11. The lower grill unit 11 includes a gridded lower grill plate 111, and the upper grill unit 12 includes a gridded upper grill plate 121. To make a waffle, a batter (not shown) is first poured onto the lower grill plate 111, and is spread manually and evenly on the lower grill plate 111. Next, the upper grill unit 12 is pivoted down to cover the lower grill unit 11 with the batter held therebetween. The lower and upper grill plates 111, 121 are then heated to cook the batter.

Since the batter contacts the lower grill plate 111 for a time period longer than that of the upper grill plate 121, it is relatively difficult to achieve the same degree of crispiness for top and bottom sides of the waffle. Moreover, it is relatively difficult to determine whether or not enough batter is poured onto the lower grill plate 111. Even if a measured cup is used to control the amount of the batter poured onto the lower grill plate 111, it is still relatively difficult to form waffles that have uniform shape using the conventional grill device in different operations of the waffle iron, thereby adversely affecting the consistency in the quality of the waffles made.

SUMMARY

Therefore, an object of the disclosure is to provide a grill device that can alleviate at least one of the drawbacks of the prior art.

According to the disclosure, the grill device is for cooking a fluidic food material, and includes an upper grill unit and a lower grill unit. The lower grill unit includes a lower grill plate. The upper grill unit removably covers and is operable to uncover the lower grill unit, and includes an upper grill plate that cooperates with the lower grill plate to define a cooking space therebetween. The cooking space is adapted to accommodate the fluidic food material when cooking. The upper grill plate defines an opening which is in spatial communication with the cooking space and which is adapted to permit the fluidic food material to flow therethrough into the cooking space.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
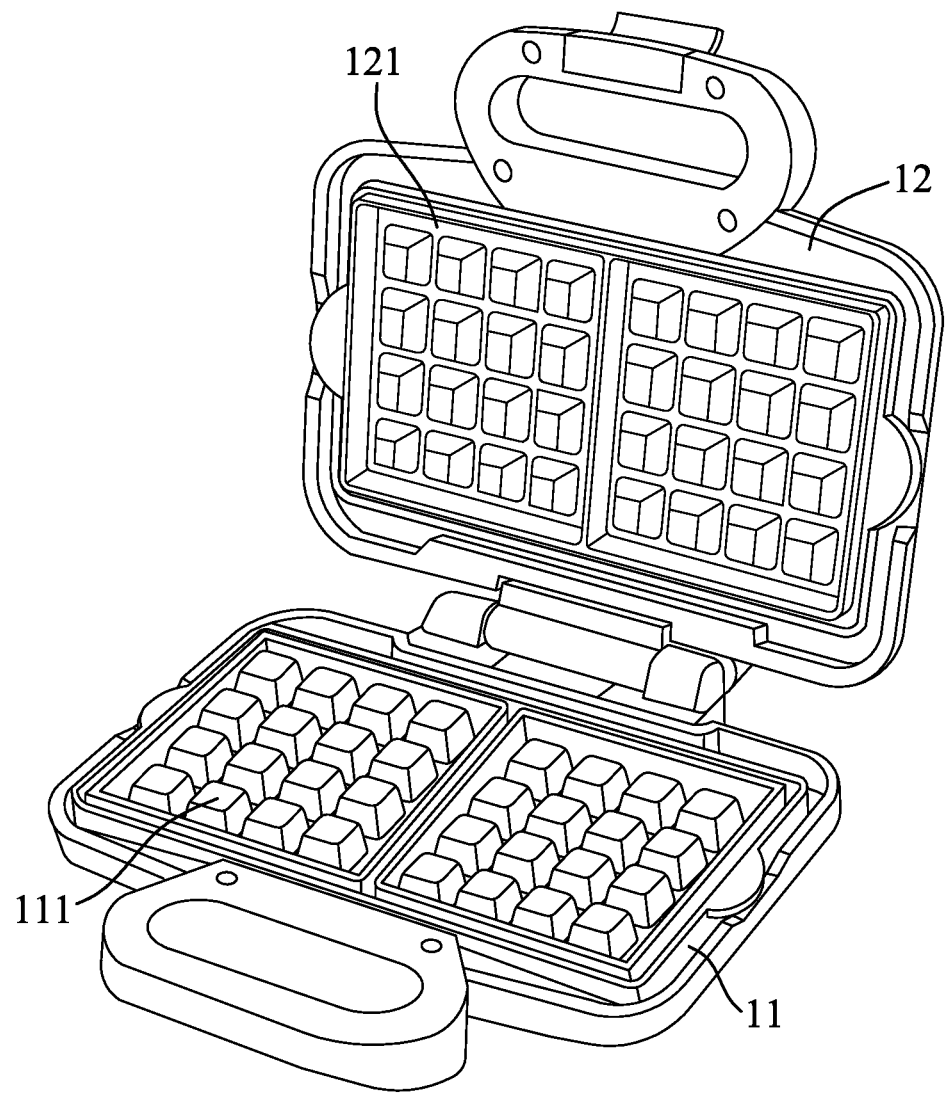
FIG. 1 is a perspective view of a conventional grill device.
Figure 2:
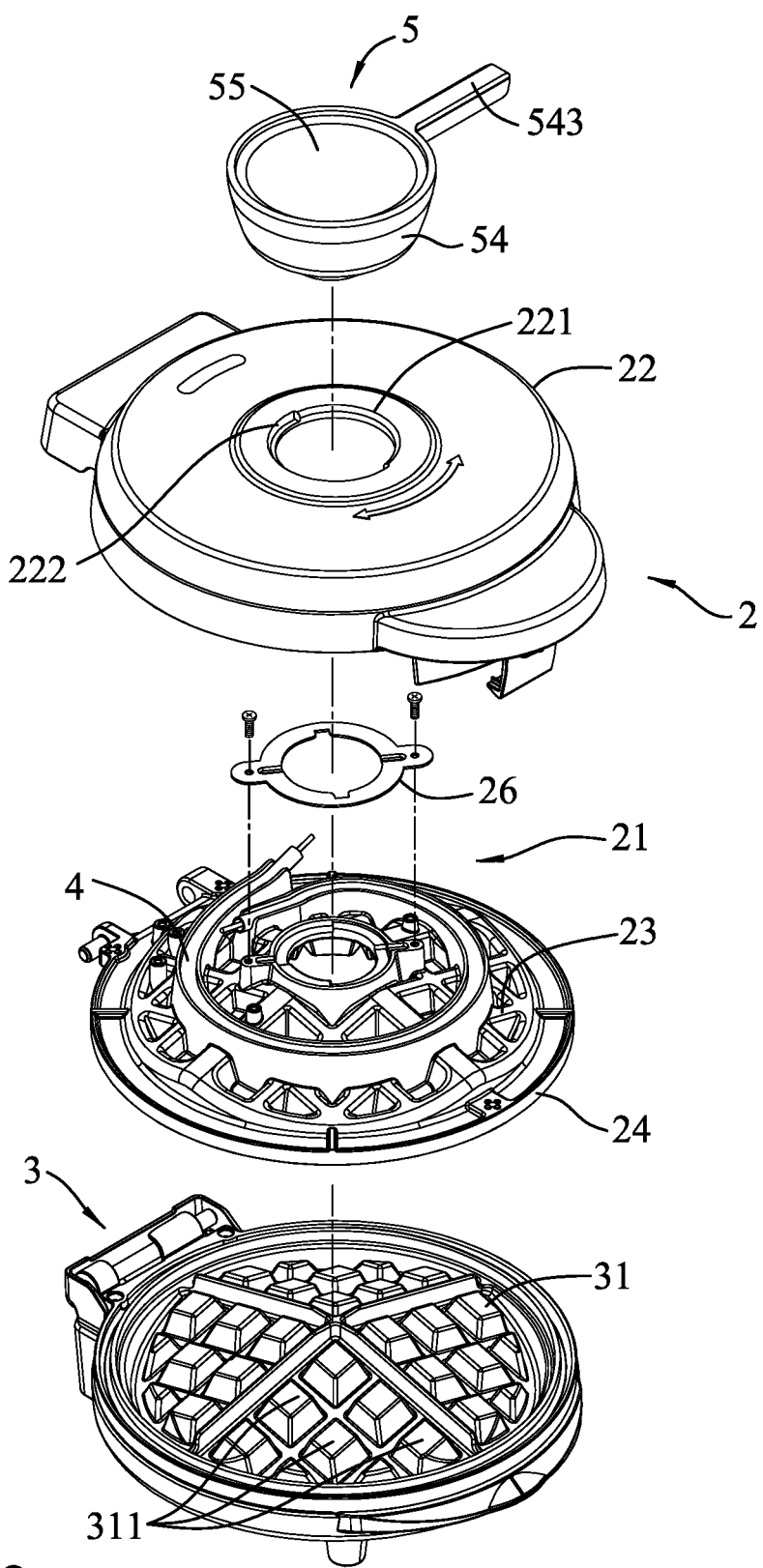
FIG. 2 is a partly exploded perspective view of an embodiment of a grill device according to the disclosure.
Figure 3:
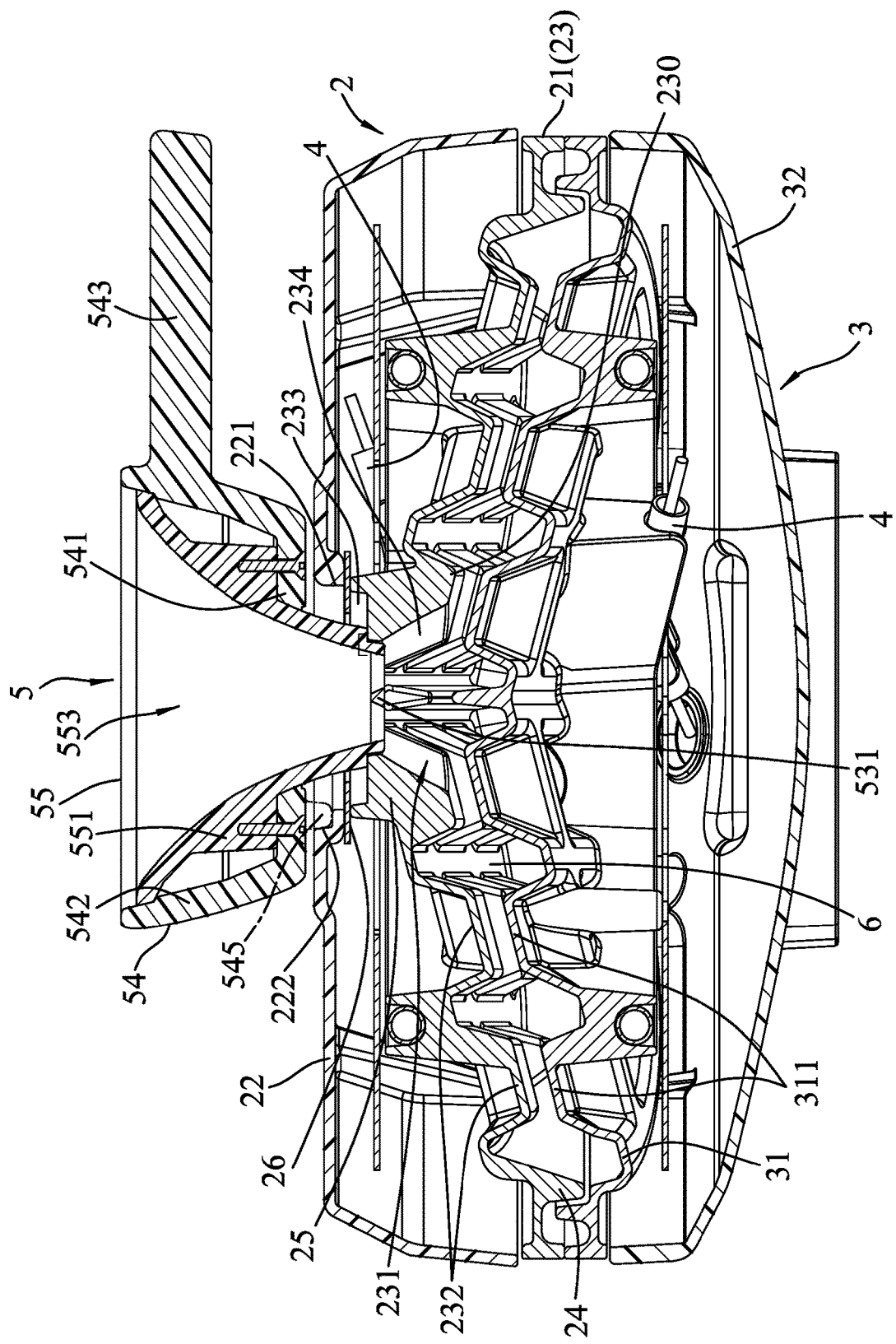
FIG. 3 is a sectional view of the embodiment.
Figure 4:
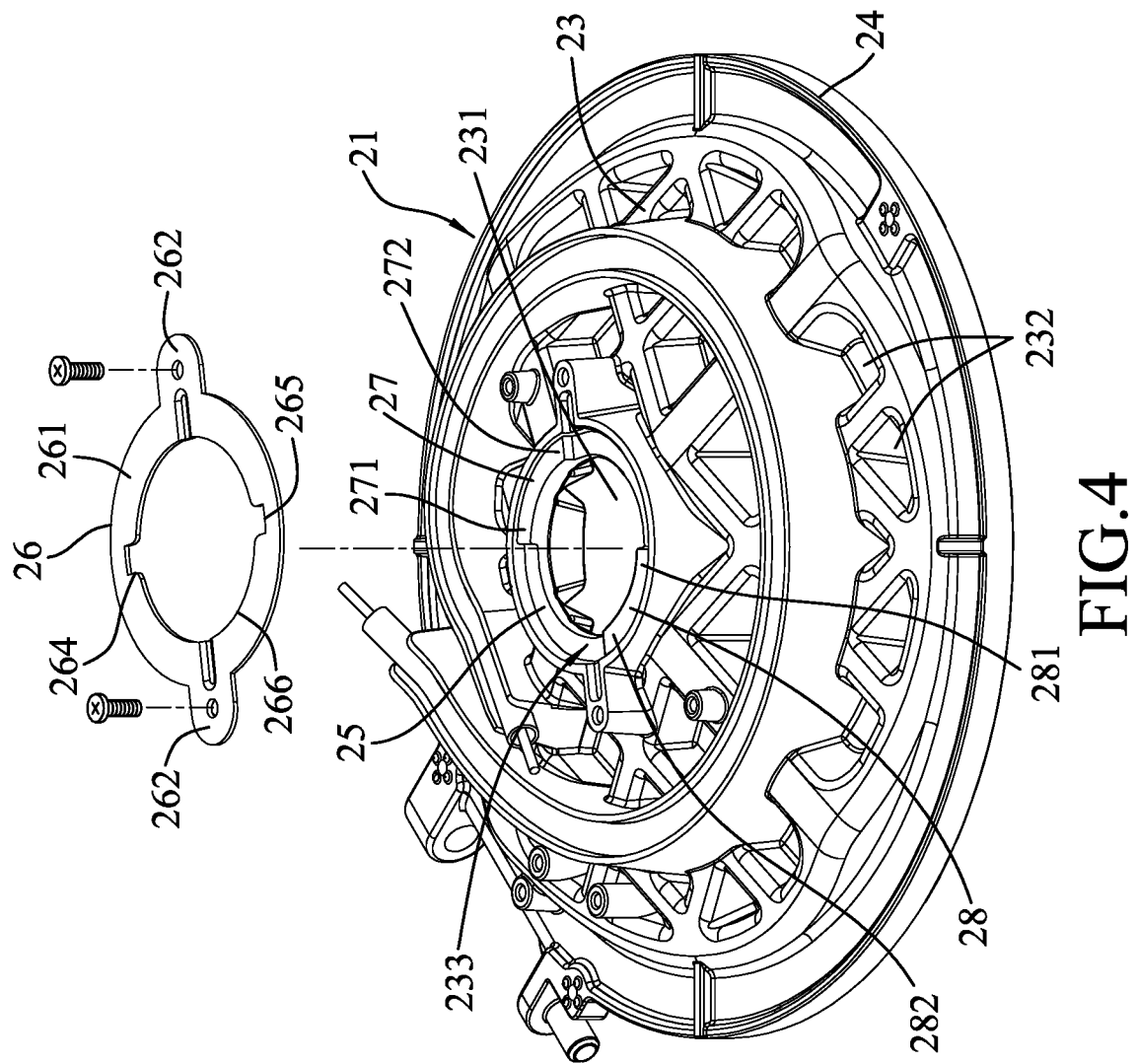
FIG. 4 is a partly exploded view of an upper grill plate and a ring plate of the embodiment.

Referring to FIGS. 2 to 4, an embodiment of a grill device according to the disclosure is for cooking a fluidic food material (not shown). In this embodiment, the fluidic food material is a batter for making a waffle. The grill device includes an upper grill unit 2, a lower grill unit 3, two heating members 4 (only one is shown in FIG. 2), and a guide unit 5.

The lower grill unit 3 includes a lower grill plate 31, and a lower casing 32 that receives the lower grill plate 31 therein. The lower grill plate 31 includes a plurality of lower projections 311 projecting upwardly toward the upper grill unit 2.

The upper grill unit 2 removably covers and is operable to uncover the lower grill unit 3, and includes an upper grill plate 21, an upper casing 22, and a ring plate 26. The upper grill plate 21 cooperates with the lower grill plate 31 to define a cooking space 6 therebetween, which is adapted to accommodate the fluidic food material when cooking. The upper grill plate defines an opening 231, which is in spatial communication with the cooking space 6 and which is adapted to permit the fluidic food material to flow into the cooking space 6 therethrough. More specifically, the upper grill plate 21 includes an annular seat 23, an annular surrounding wall 24 extending downwardly from an outer peripheral portion of the annular seat 23, and an annular extension wall 25 extending upwardly from an inner periphery 230 (see FIG. 3) of the seat 23, and cooperating with the inner periphery 230 of the seat 23 to define the opening 231. The upper grill plate 21 further includes a plurality of upper projections 232 projecting downwardly and corresponding in position to the lower projections 311.

Figure 5:
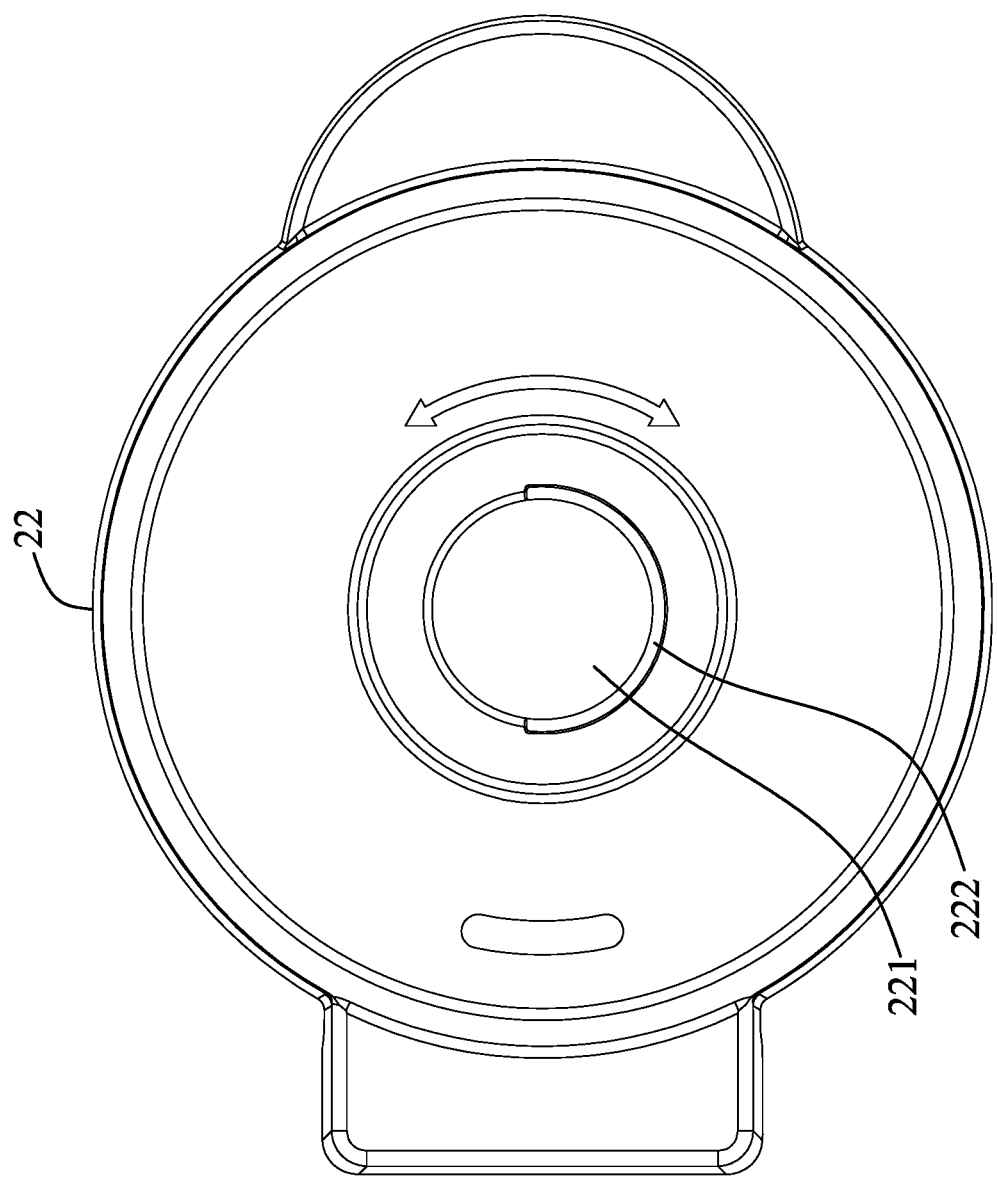
FIG. 5 is a top view of an upper casing of the embodiment.

With further reference to FIG. 5, the upper casing 22 receives the upper grill plate 21 therein, and is formed with a circular through hole 221 which is in spatial communication with the opening 231. The upper casing 22 has a top surface that is formed with an arc-shaped slide groove 222 in spatial communication with the through hole 221. More specifically, the slide groove 222 has a shape of a semicircular arc.

As shown in FIG. 4, the ring plate 26 is disposed on and above the extension wall 25, and includes a ring body 261 and two protrusions 262. The ring body 261 has an inner periphery 266 formed with a first notch 264 and a second notch 265 that is angularly spaced apart from the first notch 264. Specifically, the first and second notches 264, 265 are diametrically opposite to each other. The protrusions 262 protrude radially and outwardly from an outer periphery of the ring body 261 and are diametrically opposite to each other. Each of the protrusions 262 is angularly spaced apart from the first notch 264 by a 90-degree angle, and is angularly spaced apart from the second notch 265 by a 90-degree angle.

The upper grill plate 21 further includes a first abutment wall 27 and a second abutment wall 28 that are formed on the extension wall 25 and that are diametrically opposite to each other. Each of the first and second abutment walls 27, 28 has an arc-shape cross section, and occupies about one fourth of the annular space portion 233 of the opening 231. The first abutment wall 27 has opposite first and second ends 271, 272 and the second abutment wall 28 has opposite first and second ends 281, 282, in which the first ends 271, 281 are respectively adjacent to the first and second notches 264, 265.

In greater detail, as shown in FIG. 3, the opening 231 has an annular space portion 233 and an upwardly converging space portion 234. The annular space portion 233 is defined among the guide unit 5, the ring plate 26 and the extension wall 25, and communicates spatially with the first notch 264.

Each of the heating members 4 is configured as a heating tube in this embodiment. One of the heating members 4 is disposed between the upper casing 22 and the upper grill plate 21, and the other one of the heating members 4 is disposed between the lower casing 32 and the lower grill plate 31.

Figure 6:
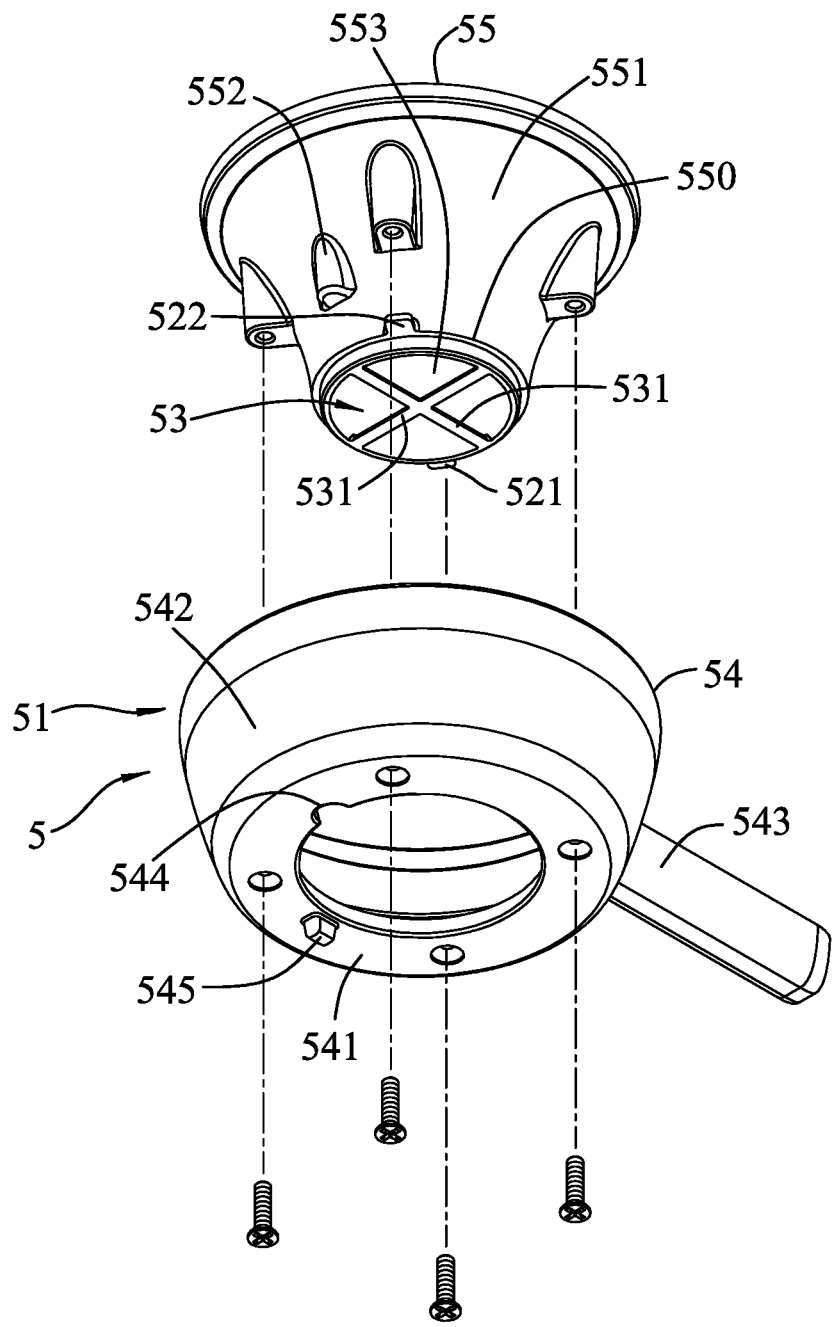
FIG. 6 is an exploded perspective view of a guide unit of the embodiment.

Referring to FIGS. 3 and 6, the guide unit 5 is removably disposed on and above the upper grill plate 21, and extends into the opening 231. The guide unit 5 includes a hollow guiding member 55 which is rotatably and partially disposed in the opening 231, a holder 54 in which the guiding member 55 is removably disposed and through which the guiding member 55 vertically extends, and a cutting set 53.

The guiding member 55 extends vertically through the through hole 221 of the upper casing 22, and includes a main body 551, a positioning member 552, a first projecting member 521, and a second projecting member 522. The main body 551 converges downwardly, and defines a downwardly converging passageway 553 which is in spatial communication with the cooking space 6 so that the fluidic food material is fed into the cooking space 6 through the passageway 553. The passageway 553 has a circular cross section, and has a bottom end that communicates spatially with a top end of the upwardly converging space portion 234 of the opening 231. The positioning member 552 protrudes outwardly from the main body 551. The first projecting member 521 projects outwardly from a bottom end portion 550 of the guiding member 55, and is located in the annular space portion 233 of the opening 231. The second projecting member 522 projects outwardly from the bottom end portion 550 of the guiding member 55, is located in the annular space portion 233 of the opening 231, and is angularly spaced apart from the first projecting member 521. More specifically, the first and second projecting members 521, 522 are diametrically opposite to each other, and each has a shape of a rectangular cuboid.

The holder 54 includes an annular bottom wall 541, an annular peripheral wall 542, a handle 543, and a protruding block 545. The annular bottom wall 541 is formed with a positioning recess 544 that engages the positioning member 552 of the guiding member 55 so as to permit the holder 54 to be co-rotatable with the guiding member 55. The annular peripheral wall 542 extends upwardly from an outer periphery of the bottom wall 541. The handle 543 protrudes outwardly from the peripheral wall 542. The protruding block 545 protrudes downwardly from a bottom surface of the bottom wall 541, and slidably engages the slide groove 222 of the upper casing 22.

The cutting set 53 is disposed in the passageway 553, is connected to a lower end of the guiding member 55, and is for cutting the fluidic food material in the passageway 553 after the fluidic food material is heated and solidified. The cutting set 53 includes two intersecting cutting members 531 each having two opposite ends connected to the bottom end portion 550 of the guiding member 55.

Figure 7:
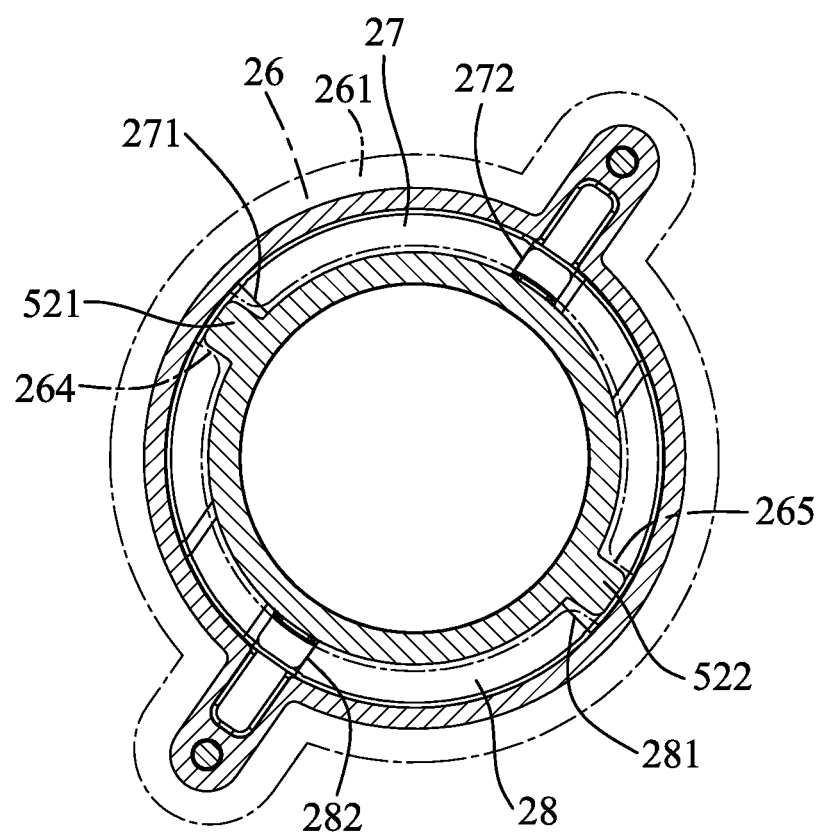
FIG. 7 is a schematic cross-sectional view illustrating the guide unit of the embodiment at a non-retained position.
Figure 8:
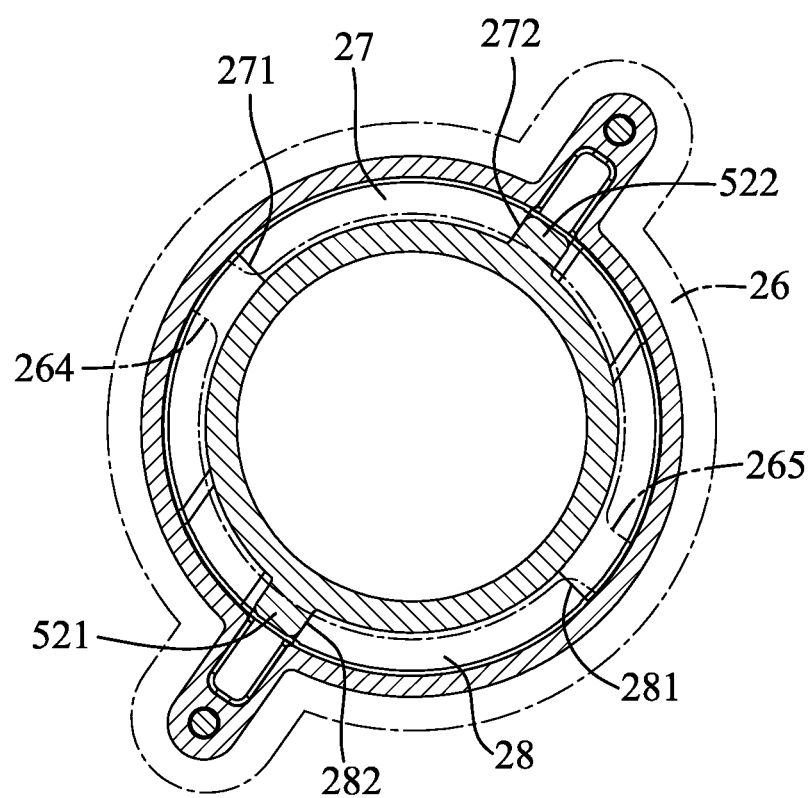
FIG. 8 is a view similar to FIG. 7, but illustrating the guide unit of the embodiment at a retained position.

Referring to FIGS. 7 and 8, the guide unit 5 is rotatable relative to the upper grill plate 21 between a non-retained position (see FIG. 7) and a retained position (see FIG. 8). When the guide unit 5 is at the non-retained position, the first projecting member 521 contacts the first end 271 of the first abutment wall 27, and the second projecting member 522 contacts the first end 281 of the second abutment wall 28. The first and second projecting members 521, 522 are respectively aligned with the first and second notches 264, 265 of the ring plate 26 in a vertical direction, so as to permit the guiding member 55 to be removed from the ring plate 26. At this time, the first and second projecting members 521, 522 are not restrained by the ring plate 26 in the vertical direction, thus, the guide unit 5 can be lifted up from the upper grill unit 2.

To move the guide unit 5 from the non-retained position to the retained position, the guide unit 5 is rotated in a counterclockwise direction, such that the first and second projecting members 521, 522 respectively rotate toward the second and first abutment walls 28, 27. When the guide unit 5 is at the retained position, the first projecting member 521 is movable in the annular space portion 233 to contact the second end 282 of the second abutment wall 28, and the second projecting member 522 is movable in the annular space portion 233 to contact the second end 272 of the first abutment wall 27. The first and second projecting members 521, 522 are misaligned from the first and second notches 264, 265 in the vertical direction, so that the guiding member 55 is retained in the annular space portion 233 by the ring plate 26. At this time, the first and second projecting members 521, 522 are restrained in the annular space portion 233 of the opening 231 by the ring plate 26 in the vertical direction, thus, the guide unit 5 cannot be lifted up from the upper grill unit 2.

It is worth mentioning that although the first and second abutment walls 27, 28 are not visible to an operator due to the presence of the guide unit 5, the operator can be made aware of the guide unit 5 reaching a selected one of the retained and non-retained positions through sensing the obstruction of movement when the first and second projecting members 521, 522 contact the first and second abutment walls 27, 28.

When the guide unit 5 is moved between the non-retained and retained positions, the guiding member 55 is rotated along with the holder 54 by virtue of the engagement between the positioning member 552 of the guiding member 55 and the positioning recess 544 of the holder 54. The protruding block 545 of the holder 54 slides along the slide groove 222 of the upper casing when the guiding member 55 is rotated. The configuration of the protruding block 545 and the slide groove 222 permits a smooth movement of the guide unit 5, and ensures that the guide unit 5 is mounted to the upper grill unit 2 in a correct manner.

When in use, the batter is poured into the guiding member 55, flows through the passageway 553 and the upwardly converging space portion 234 of the opening 231, and enters into the cooking space 6. The batter flows smoothly and outwardly toward the surrounding wall 24 of the upper grill plate 21, and then fills up the cooking space 6. As the batter flows toward the surrounding wall 24, the batter is in contact with both the upper and lower grill plates 21, 31. Therefore, top and bottom surfaces of the waffle can have the same degree of crispiness.

The upwardly converging space portion 234 of the opening 231 is configured to enable the batter to flow smoothly into the cooking space 6, and to reduce the possibility of the batter clogging the opening 231 due to the viscous nature of the batter. In this way, when the batter fills up to the bottom end portion 550 of the guiding member 55, the cooking space 6 is normally completely filled with the batter. After the waffle is formed, the operator can hold the handle 543 and rotate the guide unit 5, so that the guide unit 5 moves from one of the retained and non-retained positions to the other one of the retained and non-retained positions. In this way, when an excess amount of the batter is poured and fills the passageway 553, the cutting members 531 can cut an excess portion of the waffle in the passageway 553. As such, each waffle formed can have a consistent shape.

In this embodiment, an angle that the guide unit 5 can be rotated is 90 degrees due to the configuration of the first and second abutment walls 27, 28 that occupy about one fourth of the annular space portion 233. Since the cutting members 531 intersect to form a cross, a rotational movement of 90 degrees completes one revolution around the top end of the upwardly converging space portion 234 and ensures a separation of the excess portion of the waffle from the waffle formed in the cooking space 6. It should be noted that in other embodiments of this disclosure, the first and second abutment walls 27, 28 may be omitted so as to permit the guide unit 5 to rotate 360 degrees, so that the cutting set 53 may include only one cutting member 531 formed on the bottom end portion 550 of the guiding member 55, which cuts the excess portion of the waffle with 180-degree rotation.

In summary, by using the cutting set 53 of the guide unit 5 to cut the excess portion of the waffle, waffles formed are able to be consistent in shape. The opening 231 and the passageway 553 can be provided for observing whether sufficient amount of the batter is poured into the cooking space 6. The configuration of the upper and lower grill plates 21, 31 enables the top and bottom surfaces of the waffle formed to have the same degree of crispiness. Furthermore, the guide unit 5 is removably disposed on the upper grill unit 2, and the guiding member 55 and the holder 54 are designed to be separate components. Such design allows the guide unit 5 and the upper and lower grill units 2, 3 to be cleaned in a relatively convenient manner.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A grill device for cooking a fluidic food material, said grill device comprising:
   a lower grill unit including a lower grill plate; and
   an upper grill unit removably covering and operable to uncover said lower grill unit, and including an upper grill plate that cooperates with said lower grill plate to define a cooking space therebetween for accommodating the fluidic food material when cooking, and that defines an opening, which is in spatial communication with said cooking space and which is to permit the fluidic food material to flow into said cooking space therethrough,
   wherein said lower grill plate includes a slope surface that declines outwardly from an uppermost center portion of said lower grill plate and that faces said cooking space, said uppermost center portion being aligned with said opening in a vertical direction.

2. The grill device as claimed in claim 1, further comprising a guide unit removably disposed on and above said upper grill plate, extending into said opening, and defining a downwardly converging passageway which is in spatial communication with said cooking space so that the fluidic food material is fed into said cooking space through said passageway.

3. The grill device as claimed in claim 2, wherein:
   said upper grill plate includes an annular seat and an annular extension wall extending upwardly from an inner periphery of said seat and cooperating with said inner periphery of said seat to define said opening;
   said upper grill unit further includes a ring plate that is disposed on and above said extension wall, and that includes a ring body having an inner periphery that is formed with a first notch; and
   said opening has an annular space portion that is defined among said guide unit, said ring plate and said extension wall, and that communicates spatially with said first notch.

4. The grill device as claimed in claim 3, wherein said opening further has an upwardly converging space portion having a top end that communicates spatially with a bottom end of said passageway.

5. The grill device as claimed in claim 3, wherein:
   said guide unit includes a hollow guiding member that is rotatably and partially disposed in said opening, that defines said passageway, and that includes a first projecting member projecting outwardly from a bottom end portion of said guiding member and located in said annular space portion of said opening; and
   said guide unit is rotatable relative to said upper grill plate between a non-retained position, where said first projecting member is aligned with said first notch in a vertical direction so as to permit said guiding member to be removed from said retaining ring, and a retained position, where said first projecting member is misaligned from said first notch in the vertical direction so that said guiding member is retained in said annular space portion by said ring plate.

6. The grill device as claimed in claim 5, wherein:
   said ring body of said ring plate is further formed with a second notch being angularly spaced apart from said first notch;
   said guiding member further includes a second projecting member projecting outwardly from said bottom end portion of said guiding member, being located in said annular space portion of said opening, and being angularly spaced apart from said first projecting member; and said second projecting member is aligned with said second notch in the vertical direction when said guide unit is at the non-retained position, said second projecting member is misaligned from said second notch in the vertical direction when said guide unit is at the retained position.

7. The grill device as claimed in claim 6, wherein:

said upper grill plate further includes a first abutment wall and a second abutment wall that are formed on said extension wall, and that are diametrically opposite to each other, said first abutment wall having opposite first and second ends and said second abutment wall having opposite first and second ends, in which the first ends are respectively adjacent to said first and second notches; and when said guide unit is at the non-retained position, said first projecting member contacts said first end of said first abutment wall, and said second projecting member contacts said first end of said second abutment wall, when said guide unit is at the retained position, said first projecting member is movable in said annular space portion to contact said second end of said second abutment wall, and said second projecting member is movable in said annular space portion to contact said second end of said first abutment wall.

8. The grill device as claimed in claim 5, wherein said guide unit further includes a cutting set that is disposed in said passageway, that is connected to a lower end of said guiding member, and that is for cutting the fluidic food material in said passageway after the fluidic food material is heated and solidified.

9. The grill device as claimed in claim 8, wherein said cutting set includes two intersecting cutting members each having two opposite ends connected to said bottom end portion of said guiding member.

10. The grill device as claimed in claim 5, wherein said guide unit further includes a holder in which said guiding member is removably disposed and through which said guiding member vertically extends.

11. The grill device as claimed in claim 10, wherein:

said holder includes an annular bottom wall formed with a positioning recess, and an annular peripheral wall extending upwardly from an outer periphery of said bottom wall; and said guiding member includes a main body defining said passageway, and a positioning member protruding outwardly from said main body and engaging said positioning recess so as to permit said holder to be co-rotatable with said guiding member.

12. The grill device as claimed in claim 11, wherein said holder further includes a handle protruding outwardly from said peripheral wall.

13. The grill device as claimed in claim 11, wherein said upper grill unit further includes an upper casing that receives said upper grill plate therein and that is formed with a through hole which is in spatial communication with said opening and through which said guiding member vertically extends, said lower grill unit further including a lower casing that receives said lower grill plate therein.

14. The grill device as claimed in claim 13, wherein said upper casing has a top surface that is formed with an arc-shaped slide groove in spatial communication with said through hole, said holder further including a protruding block protruding downwardly from a bottom surface of said bottom wall, and slidably engaging said slide groove.

* * * * *